United States Patent

Yokoyama

[11] Patent Number: 5,647,125
[45] Date of Patent: Jul. 15, 1997

[54] PROCESS FOR MANUFACTURING A DRIVE PLATE

[75] Inventor: Michihiro Yokoyama, Aichi-ken, Japan

[73] Assignees: Ohashi Technica, Inc., Tokyo; Kabusiki Kaisha IPC, Anjo, both of Japan

[21] Appl. No.: 501,089

[22] PCT Filed: Mar. 7, 1994

[86] PCT No.: PCT/JP94/00364

§ 371 Date: Oct. 5, 1995

§ 102(e) Date: Oct. 5, 1995

[87] PCT Pub. No.: WO94/20239

PCT Pub. Date: Sep. 15, 1994

[30] Foreign Application Priority Data

Mar. 5, 1993 [JP] Japan ................... 5/073028

[51] Int. Cl.⁶ ........................................ B21D 28/00
[52] U.S. Cl. ................ 29/893.34; 29/893; 74/446
[58] Field of Search .................. 29/893, 893.1, 29/893.3, 893.33, 893.34; 72/358, 359; 74/446, 447

[56] References Cited

U.S. PATENT DOCUMENTS

| 2,162,902 | 6/1939 | Adams . | |
| 4,692,294 | 9/1987 | Fisher, III et al. | 29/893.3 |

FOREIGN PATENT DOCUMENTS

| 903 963 | 10/1945 | France . | |
| 51-68470 | 6/1976 | Japan . | |
| 63-2532 | 1/1988 | Japan | 29/893.34 |
| 3-281029 | 12/1991 | Japan . | |
| 6-85969 | 11/1994 | Japan . | |
| WO 91/01859 | 2/1991 | WIPO . | |

*Primary Examiner*—P. W Echols
*Attorney, Agent, or Firm*—Burns, Doane, Swecker & Mathis, LLP

[57] ABSTRACT

In a die forging process, projections (4a) are formed on an inner circumference thereof. The projections (4a) are inserted into holes (46) provided in a disc plate (45). The projections (4a) are crushed by a punch 49 so that the disc plate (45) is securely fixed on an inner circumference of the annular gear 41. The process can eliminate a cutting and an electric welding to shorten a manufacturing time.

3 Claims, 3 Drawing Sheets

1

PROCESS FOR MANUFACTURING A DRIVE PLATE

FIELD OF INVENTION

This invention relates to a process for manufacturing a drive plate having a plate integrally secured on an inner circumference thereof.

BACKGROUND ART

A drive plate meshes with a pinion gear securely set on a rotary shaft of a starter motor to start an internal combustion engine.

A conventional process for manufacturing a drive plate is as follows:

A flat bar material is curled, both of its ends are subjected to a flash butt welding, and its interior and exterior surfaces and its both surfaces are cut with a single purpose machine and a lathe to manufacture an annular gear blank. The annular gear blank is subjected to a gear cutting with a hobbing machine then a chamfering to manufacture an annular gear. A plate is pressed on an inner circumference of the annular gear. Electric weldings are performed on ten to twelve portions of the plate, each portion having approximately 15–25 mm to manufacture a drive plate.

According to such a manufacturing process, a series of processes for manufacturing an annular gear from a flat bar comprise a cutting, a gear cutting, a chamfering, and electric welding, which result in a long manufacturing time. Thus, an object of the present invention is to provide a process for manufacturing a drive plate, which process eliminates a cutting and a chamfering process to shorten a manufacturing time.

Another object of the present invention is to provide a process for manufacturing a drive plate, which process can reduce frictional resistance between a female die and a workpiece to elongate a useful life of a die.

A further object of the present invention is to provide a process for manufacturing a drive plate, which process can securely connect a plate to an annular gear.

SUMMARY

According to a process for manufacturing a drive plate of the present invention, a die forging process employs a female die having a chamfer of 20°–50° on an inlet inner circumference thereof and a fine polished tooth profile sliding on an annular workpiece. Thus, friction resistance between the female die and the annular workpiece at the inlet is reduced and an arc-shaped surface is formed at the ends of tooth profiles of the annular workpiece. After the trimming operation, multiple projections formed on an inner circumference of the annular workpiece of the female die are inserted into caulking holes provided in a disc plate and the disc plate is securely provided on the inner circumference of the annular workpiece. The projections are pressed by a punch, so that a drive plate is manufactured, the drive plate having the disc plate securely provided in the annular gear.

According to the process for manufacturing a drive plate, a press working can be performed to manufacture a drive plate without a cutting and an electric welding, which contributes to a cost reduction. Further, the manufacturing process employs the female die having the fine polished tooth profiles with the chamfers of 20–1500 provided at the inlet of the female die. Therefore, a frictional resistance between the female die and the annular workpiece is reduced, so that the useful span of life a die set, such as the female die, extends, which leads to reduction of a manufacturing cost.

Further, according to the process for manufacturing the drive plate, the die forging press consists of two processes and the chamfer provided on the inlet circumference of the female die used in a first die forging process has a larger angle than that provided on the inlet circumference of the female die used in a second die forging process.

Thus, a frictional resistance between the annular workpiece and the female die can be further reduced and the useful life span of the female die can be further extended.

Further, according to the process for manufacturing the drive plate, the hole is shaped into an oval, a star, or a cross. Thus, a material flow occurring in a pressing operation enables a more secure pressing operation. Further, even if a vibration and an impact act on the drive plate, the annular workpiece and the disc plate remain securely connected and are not disconnected.

DESCRIPTION OF PREFERRED EMBODIMENT

Referring to the attached drawings, a process for manufacturing a drive plate according to the present invention is hereinafter described.

Figure 1:
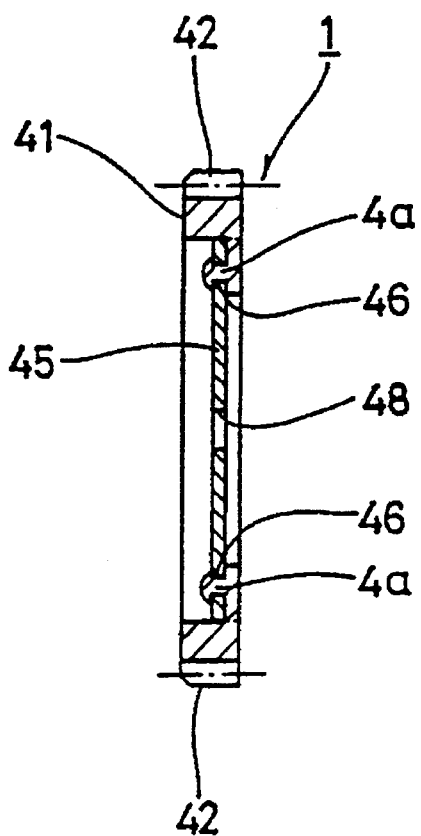
FIG. 1 is a cross sectional view of a drive plate manufactured by the manufacturing process of the present invention.

FIG. 1 is a cross sectional view of a drive plate 1 manufactured by the manufacturing process of the present invention.

Figure 2:
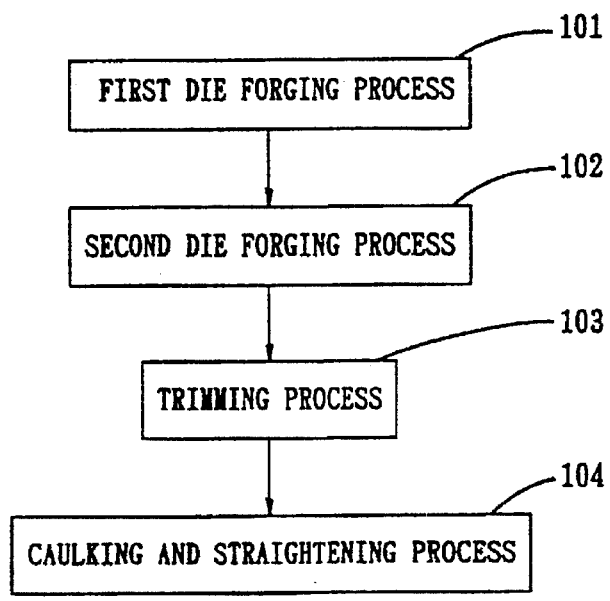
FIG. 2 is a block diagram showing an outline of the process for manufacturing the drive plate.

FIG. 2 is a block diagram showing an outline of the manufacturing process. As illustrated in FIG. 2, the manufacturing process comprises a first die forging process 101, a second die forging process 102, a trimming process 103, and a pressing and straightening process 104.

Figure 3:
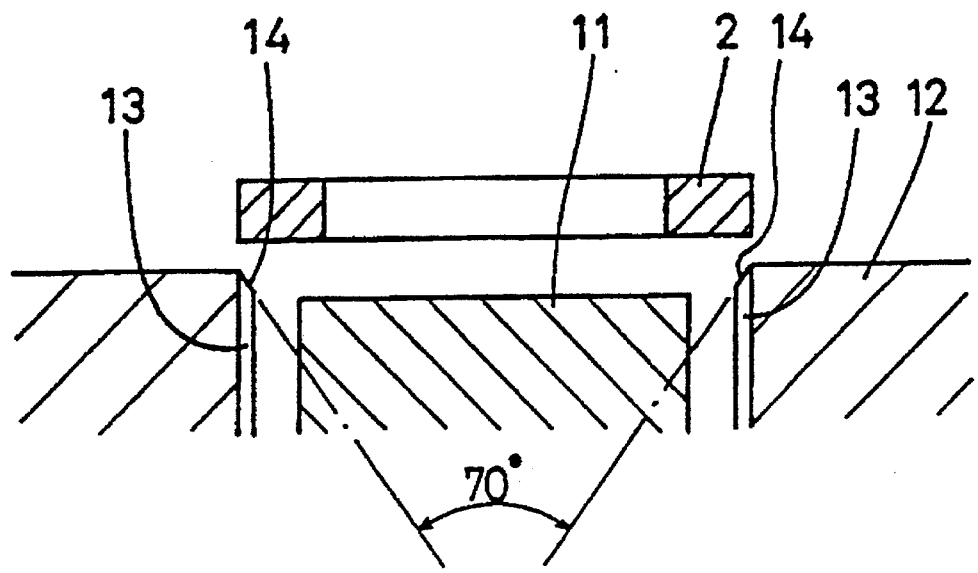
FIG. 3 is a cross sectional view outlining an annular workpiece, a fixed die, and a female die in a first die forging process.

In the first die forging process 101, a die forging operation is performed on an annular workpiece 2 using a fixed die 11 and a female die 12 as illustrated in FIG. 3. The female die 12 has a tooth profile 13 formed on an inner circumference surface thereof. Further, the female die 12 has a chamfer 14 provided on an inlet inner circumference edge thereof, the chamfer 14 having an angle of 70°. A fine polishing operation is performed on an upper outer circumference of the fixed die 11 and an upper portion of the tooth profile 13 of the female die 12 which slide on the annular workpiece 2. In the first die forging process 101, the annular workpiece 2 is pressed into the female die 12 to approximately 50% of the thickness thereof, so that a toothed part 3 is formed on an outer circumference of the annular workpiece 2 and eight to twelve bosses 4 are formed on an inner circumference thereof. The tooth profile 3 has an arc-shaped surface 15 formed at an end thereof by the chamfer 14 of the female die 12.

Figure 4:
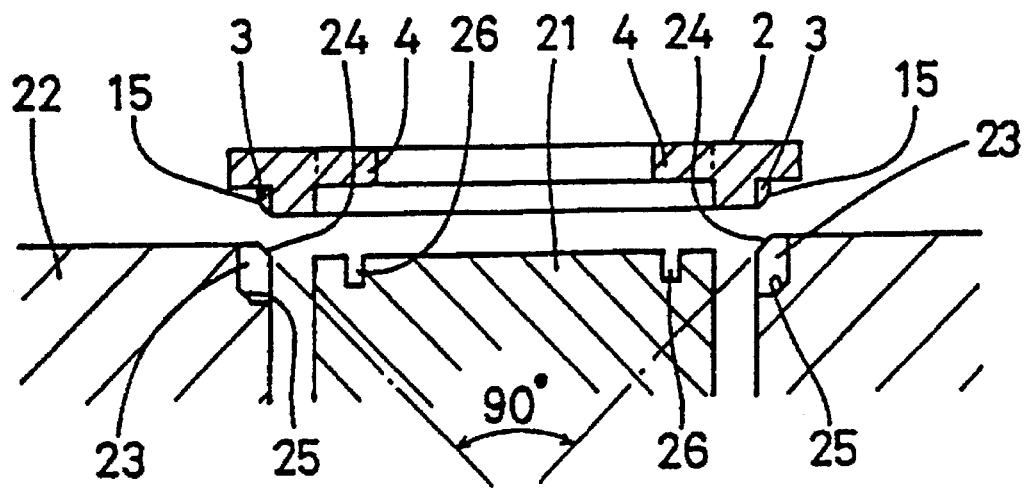
FIG. 4 is a cross sectional view outlining the annular workpiece, the fixed die, and the female die in a second die forging process.

Next, the second die forging process 102 is performed on the annular workpiece 2 manufactured through the first die forging process 101, using a fixed die 21 and a female die 22 as illustrated in FIG. 4. The female die 22 has a tooth profile 23 formed on an inner circumference surface thereof, the tooth profile 23 having a depth of approximately 70% of a thickness of the annular workpiece 2.

Further, the female die 22 has a chamfer 24 formed on an inlet inner circumference edge thereof, the chamfer 24 having an angle of 90°.

A fine finishing operation is performed on an upper outer circumference of the fixed die 21 and an upper portion of the tooth profile 23 which slide on the annular workpiece 2.

At a bottom of the tooth profile 23 of the female die 22 a projection 25 is formed to chamfer the toothed part 3 formed on the annular workpiece 2. In the fixed die 21 concavities 26 are formed to produce eight to twelve projections from the bosses 4 formed in the annular workpiece 2. In the second die forging process 102, a chamfered tooth profile 3a is formed on the outer circumference of the annular workpiece 2 and eight to twelve projections 4a are formed on the inner circumference thereof, while an excess thickness 6 occurs on the outer circumference of the annular workpiece 2 and an excess thickness 7 occurs on the inner circumference thereof.

Figure 5:
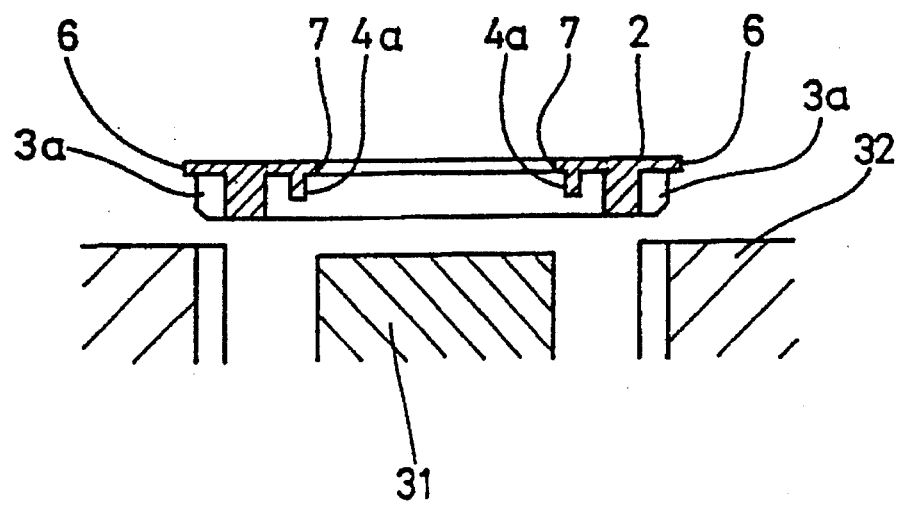
FIG. 5 is a cross sectional view outlining the annular workpiece, an inner punch, and the female die in a trimming process.
Figure 6:
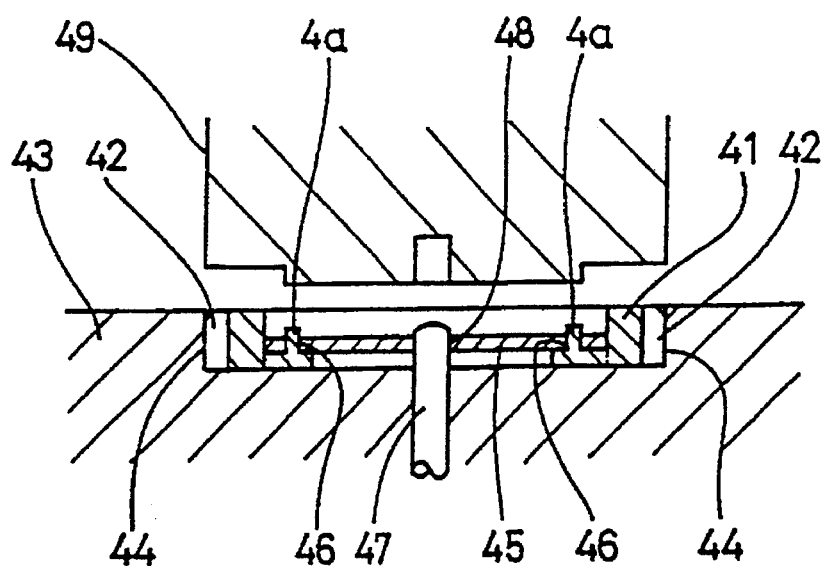
FIG. 6 is a cross sectional view outlining an annular gear, a die, and a caulking punch in a pressing and a straightening process.
Figure 7:
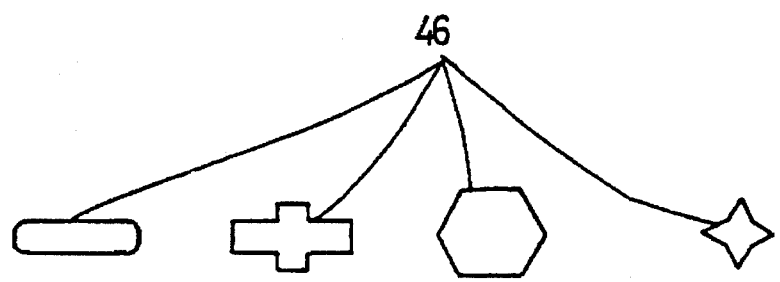
FIG. 7 shows shapes of holes as examples.

Next, the trimming process 103 is performed to trim some of the excess thickness 6 and 7 which are not needed for pressing the projections 4a, using an inner punch 31 and a female die 32 as shown in FIG. 5. At the same time, while chipping the side of the toothed part 3a minutely, the excess thickness 6 is trimmed to fabricate an annular gear 41. A toothed part 42 undergoes a high frequency quenching operation. After the trimming operation 103 is completed, the pressing and the straightening process 104 is performed. Before performing the pressing and straightening process 104, the orientation of the annnular gear 41 is reversed top to bottom, the toothed part 42 is fitted into toothed part 44 formed on an inner circumference of a male die 43, the projections 4a of the annular gear 41 are inserted into holes 46 provided in a disc plate 45, and a center guide pin 47 is inserted into a center hole 48. A punch 49 crushes the projections 4a so that the disc plate 45 is securely fixed on an inner circumference of the annular gear 41. Thus, a drive plate 1 is manufactured. In the high-frequency quenching operation, a deformation generated in the toothed part 42 of the annular gear 41 is eliminated.

During the pressing process, the projections 4a are crushed so that a material flow occurs in the hole 46. According to the present invention, the hole 46 is shaped into an oval, a star, a cross, or the like, so that the excess thickness of the projections 4a spread over the hole 46, which leads to a more secure caulking operation. Thus, even if vibration and impact act on the drive plate 1, the annular gear 41 and the disc plate 45 remain securely connected and are not disconnnected.

To secure the ring gear 41 to the disc plate 45, a rivet can also be used.

The appropriate angle of the chamfer 14 is determined in the range of 20°–150° according to the materials and the thickness of the annular workpiece 2.

(INDUSTRIAL AVAILABILITY)

According to the manufacturing process, the existing press machine can be used to manufacture the drive plate. Further, the principal parts, such as a female die and a punch, can be exchanged, so that many kinds of drive plates can be manufactured in a small amount. Also, the respective manufacturing process can be automated.

I claim:

1. A process for manufacturing a drive plate, said process comprising:

subjecting an annular workpiece to a die forging using a female die to form tooth profiles on an outer circumference of the annular workpiece and projections on an inner circumference thereof, the female die having a 20°–150° conical chamfer and a fine polished surface for sliding on the annular workpiece;

trimming the annular workpiece;

inserting the projections into holes on a disc plate so that the disc plate is securely provided on an inner circumference of the annular workpiece; and thereafter pressing the projections with a punch, whereby the disc plate is securely fixed to the annular workpiece.

2. The process according to claim 1, wherein the die forging process consists of two processes and the chamfer provided on the inner circumference of the female die used in the first die forging has a larger angle than that provided on an inner circumference of a female die used in the second die forging process.

3. The process according to claim 1 or 2, wherein each of the holes is shaped into one of an oval, a star, and a cross.

* * * * *